US012687231B2

(12) United States Patent
Stroeken

(10) Patent No.: US 12,687,231 B2
(45) Date of Patent: Jul. 21, 2026

(54) VALVE

(71) Applicant: Weir Minerals Netherlands B.V.,
Venlo (NL)

(72) Inventor: Johannes Petrus Stroeken, Roermond
(NL)

(73) Assignee: Weir Minerals Netherlands B.V.,
Venlo (NL)

( * ) Notice: Subject to any disclaimer, the term of this
patent is extended or adjusted under 35
U.S.C. 154(b) by 0 days.

(21) Appl. No.: 18/997,061

(22) PCT Filed: Aug. 17, 2023

(86) PCT No.: PCT/IB2023/058255
§ 371 (c)(1),
(2) Date: Jan. 18, 2025

(87) PCT Pub. No.: WO2024/047458
PCT Pub. Date: Mar. 7, 2024

(65) Prior Publication Data
US 2026/0029054 A1      Jan. 29, 2026

(30) Foreign Application Priority Data
Aug. 29, 2022      (GB) ..................................... 2212498

(51) Int. Cl.
*F16K 1/38*      (2006.01)
*F16K 1/42*      (2006.01)
*F16K 1/46*      (2006.01)
(52) U.S. Cl.
CPC .............. *F16K 1/385* (2013.01); *F16K 1/427*
(2013.01); *F16K 1/46* (2013.01)

(58) Field of Classification Search
CPC . F16K 1/385; F16K 1/46; F16K 1/427; F04B
39/1013
See application file for complete search history.

(56) References Cited

U.S. PATENT DOCUMENTS

| 2,260,381 | A |  | 10/1941 | Kennon |  |
|---|---|---|---|---|---|
| 2,448,429 | A |  | 8/1948 | Guy |  |
| 3,409,039 | A | * | 11/1968 | Griffin | ................... F16K 1/385 |
|  |  |  |  |  | 137/516.29 |
| 4,659,060 | A |  | 4/1987 | Scheffel |  |
| 4,671,490 | A |  | 6/1987 | Kolenc |  |

(Continued)

FOREIGN PATENT DOCUMENTS

| GB |  | 1000644 A | 8/1965 |  |  |
|---|---|---|---|---|---|
| WO |  | WO-2017004572 A2 | * | 1/2017 | ............. F16K 15/06 |

*Primary Examiner* — Kelsey E Cary
(74) *Attorney, Agent, or Firm* — Morriss O'Bryant
Compagni Cannon, PLLC

(57) ABSTRACT

A valve is described that includes: a housing (20); a flow
path connecting an inlet and an outlet in flow communica-
tion; a valve seat (28) positioned in the flow path; and a
valve body which is displaceable between a closed position
and an open position. The valve body includes a resiliently
deformable elastomeric seal (38) having (i) a contact surface
(74) which is complementary to and abuts against the valve
seat and (ii) a protrusion (84) extending radially outwards at
an upper portion thereof. The valve also has a retainer
comprising an inwardly projecting lip defining a recess for
accommodating the protrusion therein to assist with lifting
the elastomeric seal.

7 Claims, 8 Drawing Sheets

(56) References Cited

U.S. PATENT DOCUMENTS

| 7,591,450 B1 * | 9/2009 | Blume | ................... | F16K 15/06 |
| | | | | 137/516.29 |
| 10,870,320 B2 | 12/2020 | Qi | | |
| 2014/0264134 A1 * | 9/2014 | Butler | ..................... | F16K 1/385 |
| | | | | 251/357 |

* cited by examiner

1

VALVE

FIELD OF INVENTION

This invention relates to valves. More particularly, it relates to a valve and to a pumping system using that valve.

BACKGROUND OF THE INVENTION

One type of valve includes an annular valve seat and a valve body which is displaceable between an open position in which it permits the flow of medium through the valve and a closed position in which it inhibits the flow of medium through the valve. The valve body includes a complementary shaped annular contact surface which abuts against the valve seat when the valve body is in its closed position. In certain applications, the complementary surfaces of the valve seat and the valve body are formed of metal. In some applications, an elastomer valve ring is mounted on the valve body and seals against the valve seat when the valve is in the closed position.

This arrangement generally works well, however, when the valve body has to open in the presence of a large pressure differential (which may happen for actuated valves) then problems may occur. When the pressure on the side of the valve body having the elastomer valve ring is significantly higher (for example 1 MPa (10 bar) or higher) than the pressure on the side of the valve body opposite the elastomer valve ring then when the valve body is displaced away from its closed position towards its open position, by virtue of the pressure difference across the elastomer valve ring it is urged towards the valve seat and tends to deform (stretch or extrude) so that it remains in contact with the valve seat giving the impression that it is "sticking" to the valve seat. This extrusion can lead to damage to the elastomer valve ring or in some cases it may lead to it being dislodged partially or completely from the valve body. This may also negatively affect the operation of the valve and the life of the elastomer valve ring. The magnitude of pressure differential that causes problems may depend on the size of the elastomer valve ring and the pulling force exerted on the actuated valve body to open the valve.

One application where this potentially can occur is in a pressure exchange chamber ("PEC") pumping system in which an actuated valve may have to open despite there being a large pressure differential across the valve (for example, 1 MPa (10 bar) or higher). A PEC pumping system typically includes one or more pipes, each having a medium or pumped fluid valve arrangement at one end and a driving fluid valve arrangement at the other end. The combination of each pipe and its associated valves defining a PEC.

There are many other applications where valves are used to regulate the flow of medium in high pressure applications where this problem could potentially occur. For example, another application where this can occur is in hydraulically driven positive displacement pumps that use actuated valves. It may have application where non-return valves (check valves) are used, It is among the objects of an embodiment of this invention to provide means which may at least ameliorate this problem or provide a useful alternative.

SUMMARY

This summary is provided to introduce a selection of concepts that are further described in the detailed description below. This summary is not intended to identify indispensable features of the claimed subject matter, nor is it intended for use as an aid in limiting the scope of the claimed subject matter.

In this application ordinal numbers (first, second, third, etc.) are assigned arbitrarily herein, and are used to differentiate between parts, and do not indicate a particular order, sequence, or importance.

According to a first aspect of the invention there is provided a valve comprising: a housing; an inlet leading into the housing; an outlet leading from the housing at a position spaced from the inlet; a flow path connecting the inlet and the outlet in flow communication; a valve seat positioned in the flow path; a valve body which is displaceable between a closed position in which it inhibits the flow of medium through the flow path and an open position in which it permits the flow of medium through the flow path, the valve body including an elastomeric seal having (i) a contact surface which is complementary to and abuts against the valve seat when the valve body is in its closed position and (ii) a protrusion extending radially outwards at an upper portion thereof; and a retainer comprising an inwardly projecting lip defining a recess for accommodating the protrusion therein to assist with lifting the elastomeric seal, thereby minimising or preventing sticking or deformation thereof when the valve body is displaced away from its closed position towards its open position.

The valve may include an actuator whereby the valve body is displaceable between its open and closed positions. Optionally, the actuator is moveable hydraulically, pneumatically, or electrically. One suitable example is a linear, hydraulic actuator.

The valve seat may comprise an integral portion of a support (such as the housing) or a removable part that can be replaced when worn.

The valve seat may be annular and arranged around the flow path such that the flow path extends therethrough. When the valve body is in the closed position, the valve seat may have a higher pressure side and a lower pressure side, the diameter of the valve seat may decrease for at least part of its length from the higher pressure side towards the lower pressure side. In one embodiment, the valve seat is frusto-conical in shape and has a constant angle of taper from its higher pressure side to its lower pressure side. When the valve is open, either side of the valve seat may have a higher pressure at any given time.

The valve body may comprise an engagement portion having an annular seal surface (optionally frusto-conical in shape) complementary to and configured to abut sealingly against the valve seat when the valve body is in its closed position.

The elastomeric seal may be mounted on the engagement portion.

The valve body (for example, the elastomeric seal) may include a cap portion and a tapered portion extending from the cap portion to the contact surface.

The retainer may form part of a piston coupled to the cap portion. The piston may be coupled to the cap portion at an end of the elastomeric seal opposite the annular seal surface.

The piston may extend laterally beyond the annular seal surface of the engagement portion.

The lip may comprise a radially inward projection extending towards a central bore for at least 5%, 6%, 7%, 8%, 9%, 10%, 11%, 12%, 13%, 14%, or 25% of the distance from an outer surface of the piston towards a centre (e.g. a centreline of a central bore) of the elastomeric seal. In some embodiments, the projection may extend between 5% and 30% of the distance from the outer surface of the piston to a central bore.

The engagement portion may define a seal support surface onto which an internal contact surface of the elastomeric seal is mounted. The seal support surface may comprise a frusto-conical shape (optionally, where the internal contact surface of the elastomeric seal is frusto-conical, oppositely disposed thereto) widening as it extends towards the annular seal.

The retainer recess, engagement portion seal support surface, and internal contact surface of the elastomeric seal, may combine to resist deformation of the elastomeric seal as the valve body is moved from the closed position to the open position.

The contact surface of the elastomeric seal optionally protrudes laterally beyond the annular seal surface of the engagement portion. This arrangement permits the contact surface of the elastomeric seal to make contact with the valve seat before the valve body reaches its fully closed position in which the annular seal surface is in contact with the valve seat. Further displacement of the valve body towards its fully closed position results in the elastomeric seal deforming and the annular seal surface coming into contact with the valve seat. Hence, even if solid particles are trapped between the annular seal surface and the valve seat which prevent the valve body being displaced to its fully closed position, the provision of the elastomeric seal (protruding laterally beyond the annular seal surface) will inhibit the flow of medium through the valve.

An end of the cap portion optionally protrudes beyond the contact surface of the elastomeric seal.

The retainer may comprise any other convenient shape or configuration. For example, it may comprise an elongate fixture screwed or otherwise secured into the elastomeric seal.

According to a second aspect of the invention there is provided a closure device for sealing against a valve seat, the closure device comprising: (i) an engagement portion defining (a) a sealing surface complementary to and configured to abut sealingly against a valve seat when the closure device is in a closed position, and (b) a seal support surface; (ii) an elastomeric seal mounted on the seal support surface and having a contact surface configured to abut sealingly against the valve seat adjacent the engagement portion sealing surface; (iii) a piston coupled to the engagement portion and comprising a retainer; the elastomeric seal being held by the engagement portion and the retainer to resist displacement of the elastomeric seal when the closure device is displaced away from its closed position towards its open position.

The piston may promote lateral displacement of the elastomeric seal when the closure device is displaced from its open position to its closed position.

The engagement portion and the elastomeric seal may comprise a valve body.

The elastomeric seal may define an annular contact surface.

The contact surface of the elastomeric seal optionally protrudes laterally beyond the sealing surface of the engagement portion such that the contact surface makes contact with the valve seat before the sealing surface when the valve body is displaced towards its closed position.

The sealing surface optionally comprises an annular sealing surface.

The annular sealing surface optionally comprises a frusto-conical shape complementary to a frusto-conical shape of the valve seat.

The piston may define a body portion and an external sidewall protruding beyond the body portion, and the retainer may extend laterally inwards, towards the engagement portion, from the external sidewall, defining a recess between an internal surface of the retainer and the body portion.

The elastomeric seal may define an annular tongue (or protrusion) extending laterally (or radially) beyond a side portion of the elastomeric seal. The side portion of the elastomeric seal may extend from beneath the annular protrusion to the contact surface.

According to a third aspect of the invention, there is provided an elastomeric seal for use in a valve, the elastomeric seal including an annular body, having a valve seat end, an actuation end, and a centrally disposed hole extending through the body between the ends; an annular contact surface at the valve seat end configured to abut sealingly against a valve seat; and a retaining formation defined at or towards the actuation end of the body for engagement with a retainer.

The retaining formation may comprise an annular protrusion (such as a tongue).

The elastomeric seal may be formed as a unitary moulding of an elastomeric material, such as polyurethane rubber. Any other convenient elastomeric material may be used, such as Styrene-Butadiene Rubber (SBR), Polyurethane rubber (PUR), Ethylene Propylene Diene Monomer (EPDM) rubber, Fluroelastomer (FKM) rubber, Nitrile Butadiene Rubber (NBR), or Hydrogenated Acrylonitrile Butadiene Rubber (HNBR), depending on the liquid and temperatures being used.

The annular contact surface may be frusto-conical in shape, a diameter of the contact surface increasing away from the valve seat end.

According to a fourth aspect of the invention there is provided a PEC pumping system which includes: at least one PEC; and a medium valve arrangement at one end of the PEC and a driving fluid valve arrangement at an opposite end of the PEC to the medium valve arrangement, at least one of the valve arrangements including at least one valve of the type described above.

According to a fifth aspect of the invention there is provided an elastomeric seal for use in a valve, the elastomeric seal including an annular body, having a valve seat end, an actuation end, and a centrally disposed hole extending through the body between the ends; an annular contact surface at the valve seat end configured to abut sealingly against a valve seat; and a retaining formation defined at or towards the actuation end of the body for engagement with a retainer.

Features of one of the aspects above may be combined with other aspects.

BRIEF DESCRIPTION OF THE DRAWINGS

These and other aspects of the invention will now be described, by way of example, with reference to the accompanying diagrammatic drawings, in which.

DETAILED DESCRIPTION OF EMBODIMENTS

Figures 1, 2:
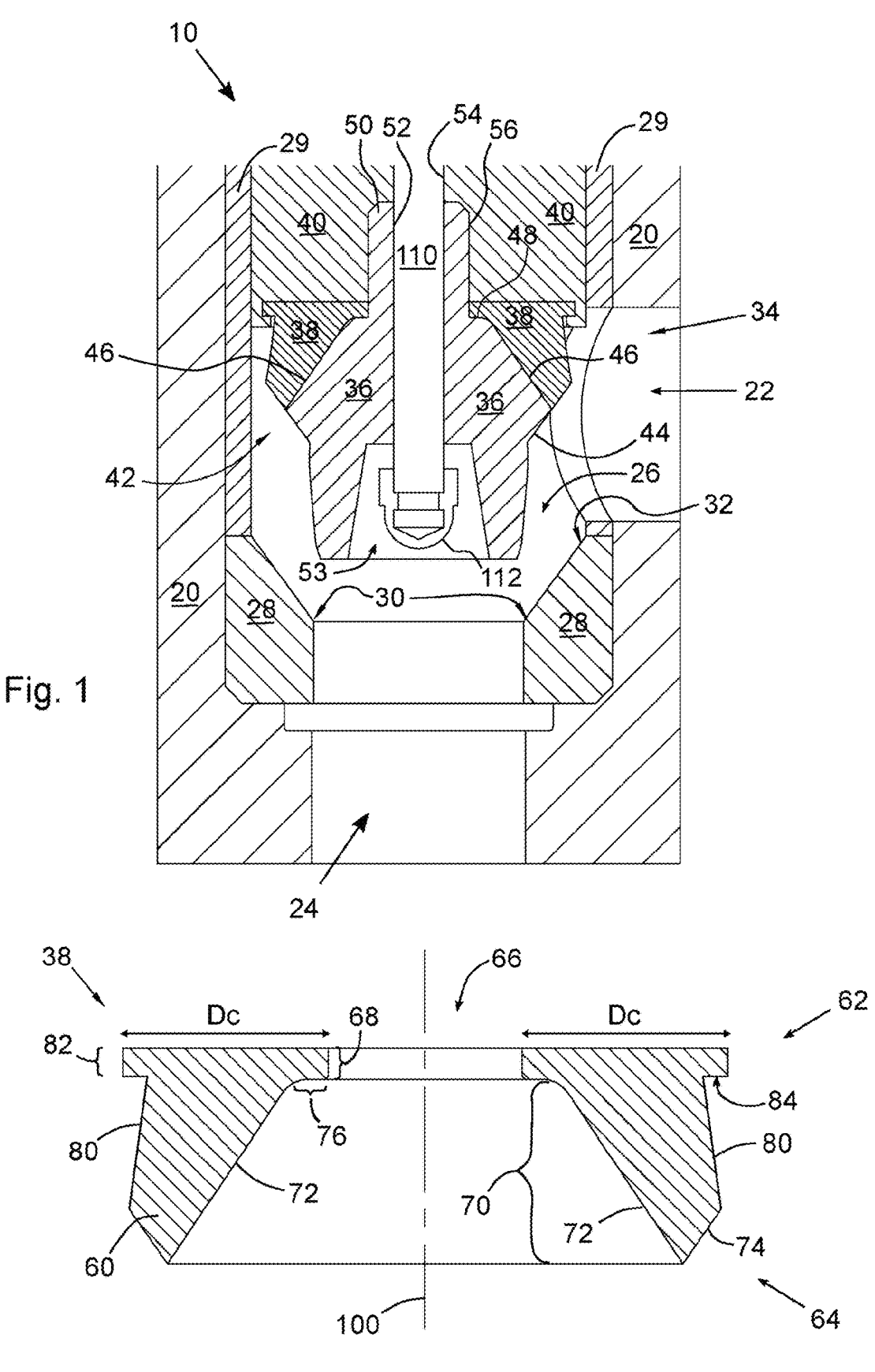
FIG. 1 shows an axial sectional view of part of a valve in accordance with an embodiment of the invention.
FIG. 2 shows a sectional view of part (an elastomeric seal) of the valve of FIG. 1 in accordance with another embodiment of the invention.

Reference will now be made to the drawings, in which reference numeral 10 indicates a valve according to one embodiment of the present invention. The valve 10 includes a housing, part of which is shown in the drawings and is generally indicated by reference numeral 20. A first fluid port 22 (in this embodiment an inlet) and a second fluid port 24 (in this embodiment an outlet) are each defined by the housing 20, and a flow path, generally indicated by reference numeral 26, extends through the housing 20 and connects the fluid ports 22, 24 in flow communication, as described in more detail below. However, in other embodiments the first fluid port 22 may be used as an outlet and the second fluid port 24 may be used as an inlet.

The valve 10 further includes a valve seat, generally indicated by reference numeral 28, which is positioned between the two fluid ports 22, 24. In one embodiment, the valve seat 28 may be formed by a hardened surface in the housing. In another embodiment, shown in the drawings, the valve seat 28 is formed by an insert mounted on the housing 20, which facilitates replacement of the valve seat 28 when worn.

A housing sleeve 29 is provided above the valve seat 28 and includes an aperture defining the first fluid port 22. The housing sleeve 29 maintains the valve seat 28 in position by urging the valve seat 28 into the housing 20. The housing sleeve 29 is a wear part that is replaceable when worn by solid particles in the medium being transported through the valve 10.

The valve seat 28 is an annular valve seat, and defines a part of the flow path 26. The valve seat 28 is frusto-conical in shape and has a narrow end 30 and a wider end 32, as is typical for valve seats. In other embodiments, the valve seat 28 may have a non-conventional shape.

A closure device 34 is provided to open away from, and close against, the valve seat 28 and thereby open and close the flow path 26. The closure device 34 comprises an engagement portion 36, an elastomeric seal 38 mounted on the engagement portion 36, and a piston 40 coupled to both the engagement portion 36 and the elastomeric seal 38. The combination of the engagement portion 36 and the elastomeric seal 38 may be referred to as a valve body 42.

The engagement portion 36 defines a frusto-conical, annular seal (or sealing) surface 44, complementary to and configured to abut sealingly against the valve seat 28 when the valve body 42 is in its closed position. The seal surface 44 may have any convenient shape but is preferably complementary to the shape of the valve seat 28. In this embodiment, the seal surface 44 is frusto-conical. The engagement portion 36 has a metal (or alloy) composition in this embodiment, but may have a different composition (for example, including a ceramic) in other embodiments.

The engagement portion 36 also defines a seal support surface 46 onto which the elastomeric seal 38 is mounted (for example, by adhesive or as an interference fit). The seal support surface 46 comprises a frusto-conical shape (opposite to the frusto-conical shape of the seal surface 44) widening as it extends towards the annular seal surface 44. The narrow end of the seal support surface 46 merges with a circular flange 48 from which a cylindrical sleeve 50 axially extends. The engagement portion 36 also defines a central bore 52 axially extending therethrough and leading to an enlarged cavity 53 (also defined by the engagement portion 36) having an opening at an end opposite the piston 40.

The piston 40 is generally cylindrical and defines a narrow central bore 54 (of the same, or very similar, diameter to the engagement portion central bore 52), and a wider central bore 56 that accommodates the cylindrical sleeve 50 of the engagement portion 36.

As best seen in FIG. 2, the elastomeric seal 38 includes an annular body 60, having a generally planar piston end 62 for coupling to the piston 40 and a valve seat end 64 for coupling to the valve seat 28. The body 60 defines a profiled central aperture 66 extending therethrough and defining (i) a cylindrical piston portion 68 dimensioned to fit around the cylindrical sleeve 50, and to provide a relatively small expansion spacing 69 therebetween (best seen in FIG. 9A) to allow for deformity of the elastomeric seal 38 into the expansion spacing during operation, and (ii) a frusto-conical valve seat portion 70 (beneath the cylindrical piston portion 68) having an internal frusto-conical contact surface 72 dimensioned to fit around the seal support surface 46 of the engagement portion 36 and optionally secured thereto by adhesive. The annular body 60 also includes an external frusto-conical contact surface 74 (tapering in an opposite direction to the internal frusto-conical contact surface 72) and dimensioned to abut sealingly against the valve seat 28 when the valve body 42 is in the closed position.

A generally planar, annular flange engagement surface 76 extends between the cylindrical piston portion 68 and the frusto-conical valve seat portion 70. The flange engagement surface 76 sits on the circular flange 48 of the engagement portion 36.

The annular body 60 further comprises a tapered sidewall 80 extending from an upper part of the external frusto-conical contact surface 74 to an underside of a cap portion 82 at the piston end 62 so that the cap portion 82 forms a protrusion 84 extending laterally beyond the tapered sidewall 80. In this embodiment, the cap portion 82 is generally disc shaped.

Figures 3A, 3B, 3C:
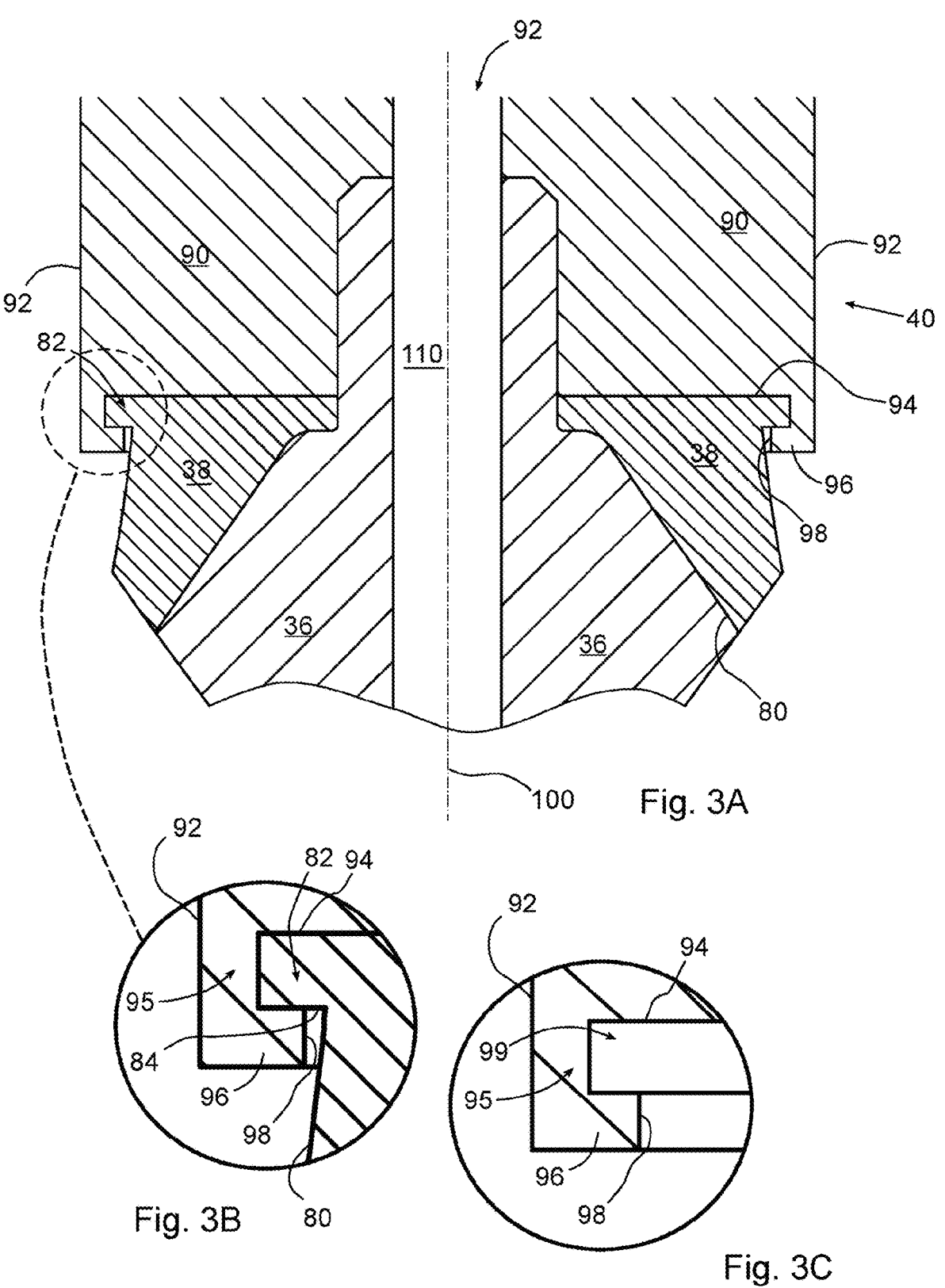
FIG. 3A shows an enlarged part of the valve of FIG. 1.
FIG. 3B shows a detail of FIG. 3A in further enlargement.
FIG. 3C shows the detail of FIG. 3B but with a part (an elastomeric seal) removed for clarity.
Figure 4:
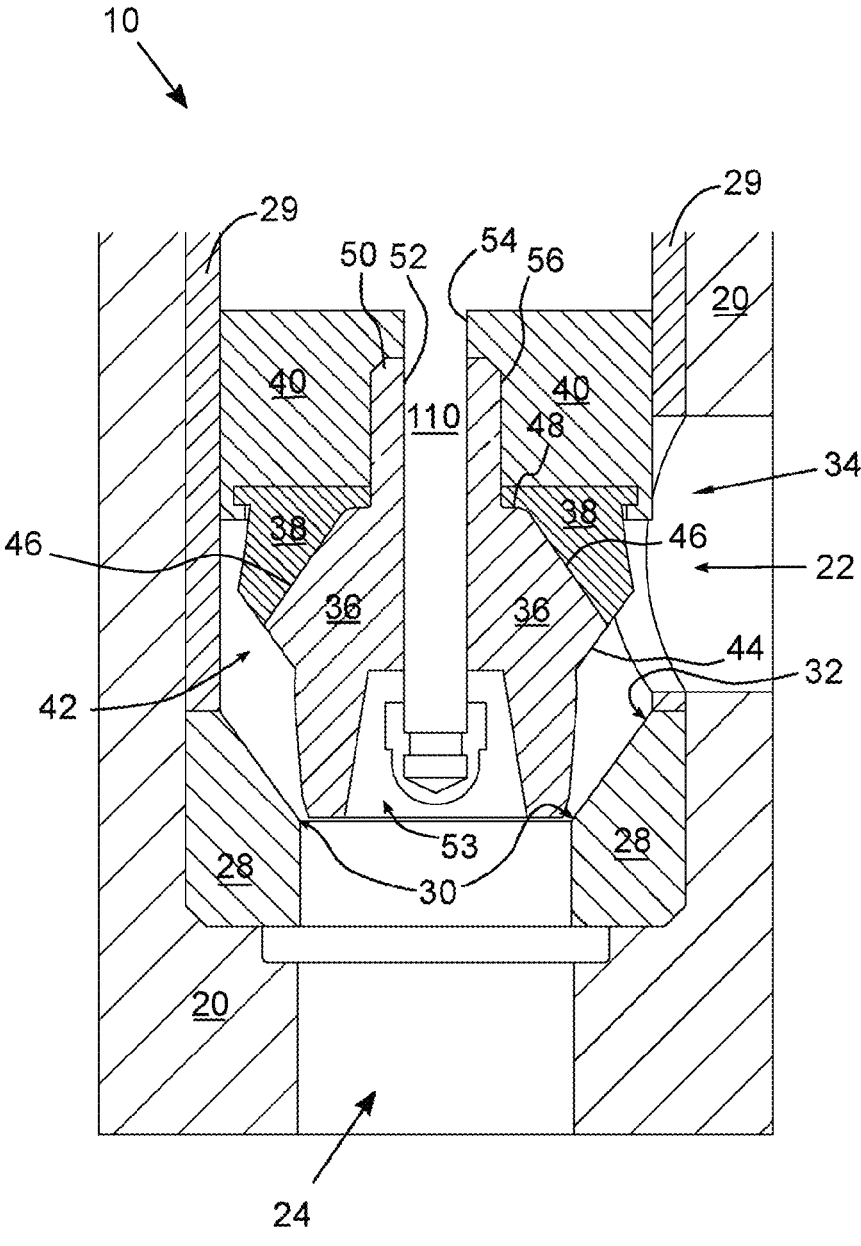
FIGS. 4 to 8 show sectional views of the valve of FIG. 1 and illustrate sequentially the displacement of a valve body of the valve from a partially open position shown in FIG. 1 of the drawings to its closed position shown in FIG. 6 of the drawings.
Figure 5:
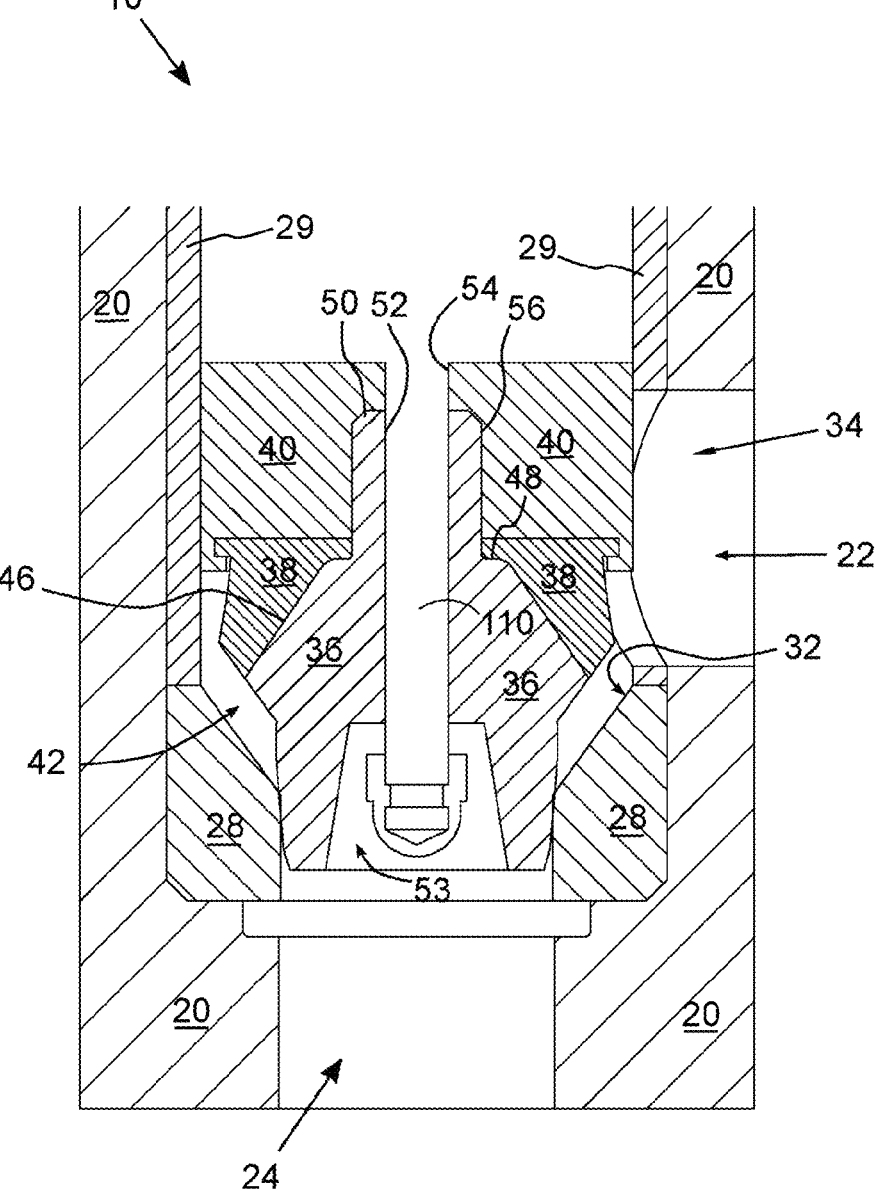
Figure 6:
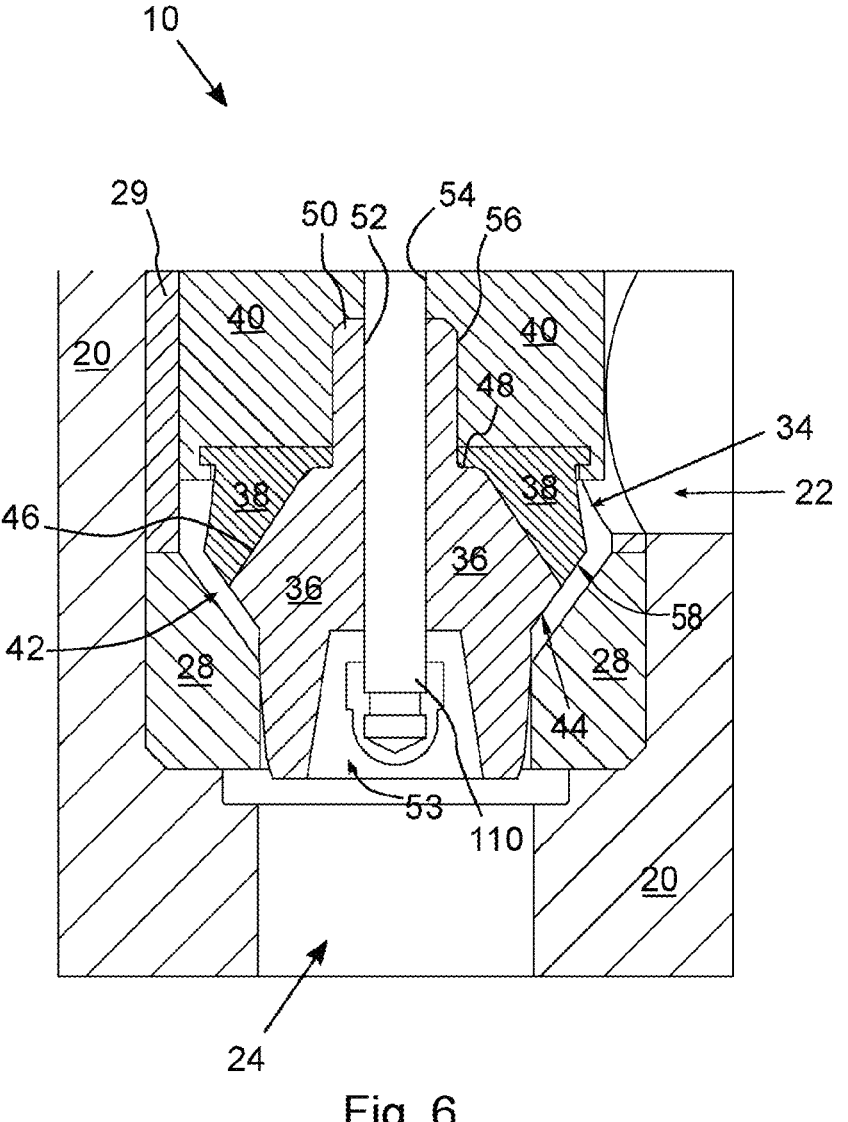
Figure 9A:
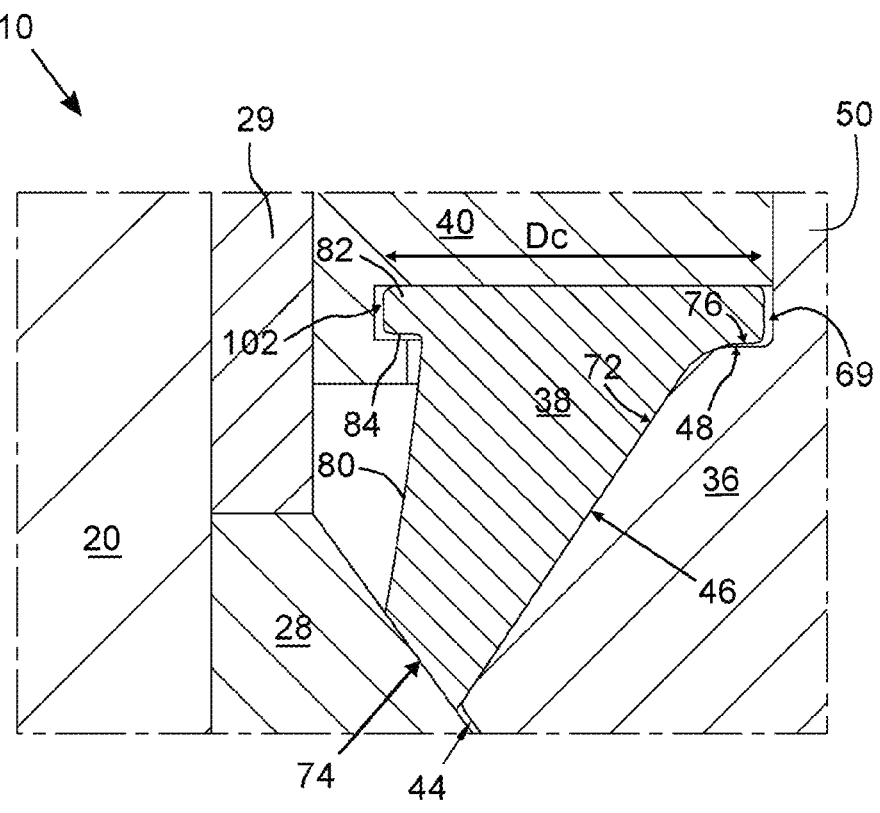
FIG. 9A shows an enlarged sectional view of part of a valve body of the valve of FIGS. 1 to 8, with the elastomeric seal in place.

The distance from the perimeter of the profiled central aperture 66 to an outer edge of the cap portion 82 is labelled Dc in FIGS. 2 and 9A. As best seen in FIGS. 3A to 3C (which are enlarged views of part of FIG. 1) and also FIG. 9B, the piston 40 further comprises a body 90 having an outer surface 92 and a generally planar elastomer engagement surface 94 on a lower part of the body 90 and extending for substantially all of the diameter of the body 90. A lower part of the outer surface 92 extends axially beyond the engagement surface 94 to form a collar 95 and then projects radially inwards towards the central bore 54 to form a lip 96 that terminates to form an annulus 98.

A recess 99 is defined between the engagement surface 94, the collar 95, and inwardly projecting lip 96.

In this embodiment, the lip 96 extends for approximately 10% of the radius of the cylindrical body 90. In other embodiments, the lip 96 may extend between 5% and 30% of the distance from the outer surface 92 to the central bore 54. The lip 96 operates as a retainer to grip the cap portion 82 and thereby hold the elastomeric seal 38 in place.

In this embodiment, the inwardly projecting lip 96 is generally parallel to the engagement surface 94 and transverse (in some embodiments perpendicular) to a longitudinal axis 100 of the central bore 54.

In this embodiment the recess 99 is generally C-shaped having an opening facing (i.e. opening towards) the longitudinal axis 100, and the collar 95 circumferentially encloses the cap portion protrusion 84.

Figure 9B:
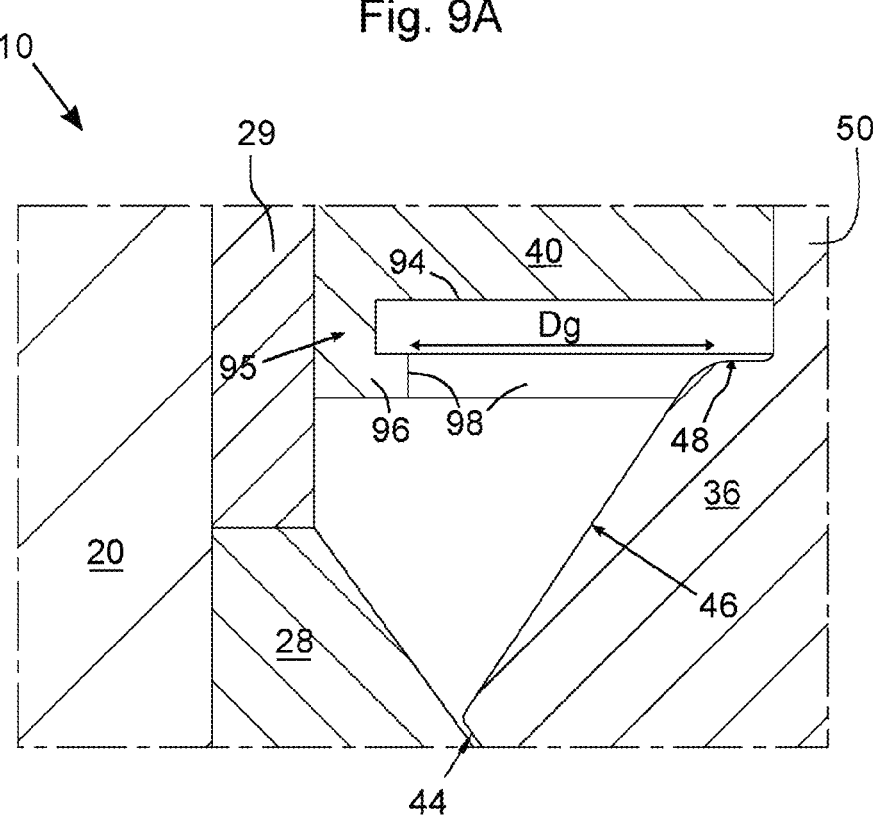
FIG. 9B shows an enlarged sectional view of part of a valve body of the valve of FIGS. 1 to 8 with the elastomeric seal removed.

As best seen in FIG. 9B (in which the elastomeric seal 38 is not shown), the circular flange 48 and the lip annulus 98 are separated by distance Dg, which is smaller than distance Dc. The combination of the circular flange 48 and the lip 96 provide support to the elastomeric seal 38 that prevents or reduces extrusion thereof during valve opening, and thereby prevents (or at least greatly reduces the likelihood of) the elastomeric seal 38 being pulled out of the lip 96 when the valve is opened.

In some embodiments, Dg is less than 90% of Dc; in other embodiments, Dg is less than 85% of Dc; in other embodiments, Dg is less than 80% of Dc.

The radius of the cap protrusion 84 and the height of the cap portion 82 are selected to be slightly smaller than the length and height of the recess 99 (best seen in FIG. 9A), preferably so that the cap portion 82 fits easily within the recess 99 when located therein, and defines a lip expansion cavity 102 (best seen in FIG. 9A) between the cap portion 82 and the collar 95. This allows for deformation of the cap portion 82 into the recess 99. Fluid communication channels (not shown) may be provided in the piston 40 (e.g. as external grooves and as internal apertures) to allow fluid to fill any space between the cap portion 82 and the recess 99, and to allow passage of fluid from the lip expansion cavity 102 or the expansion spacing 69 to the external grooves.

The closure device 34 is assembled as follows. The cap portion 82 of the elastomeric seal 38 is inserted into the recess 99 of the piston 40 until it is securely gripped in place (which may involve the cap portion 82 being temporarily deformed). The engagement portion 36 is then inserted into the combination of the elastomeric seal 38 and the piston 40. This brings seal support surface 46 into contact with internal frusto-conical contact surface 72, and the planar elastomer engagement surface 94 into full contact with the upper surface of cap portion 82. The circular flange 48 is also usually brought into contact with the flange engagement surface 76. A threaded rod (or stud bolt) 110 is placed through the aligned bores 52, 54 of the engagement portion 36 and piston 40, respectively, and is secured in place by one or more nuts (or other securing elements) 112 mounted on an end portion of the threaded rod 110 in the enlarged cavity 53 to urge the engagement portion 36 and the combination of the elastomeric seal 38 and the piston 40 towards one another, thereby sandwiching the elastomeric seal 38 between the engagement portion 36 and the piston 40.

The external frusto-conical contact surface 74 of the elastomeric seal 38 is dimensioned to protrude beyond a line extrapolated from the seal surface 44 (best seen in FIG. 9), so that when the valve body 42 is displaced towards its closed position, the external frusto-conical contact surface 74 makes contact with the surface of the valve seat 28 before the seal surface 44 of the engagement portion 36 makes contact with the valve seat 28.

Figures 7, 8:
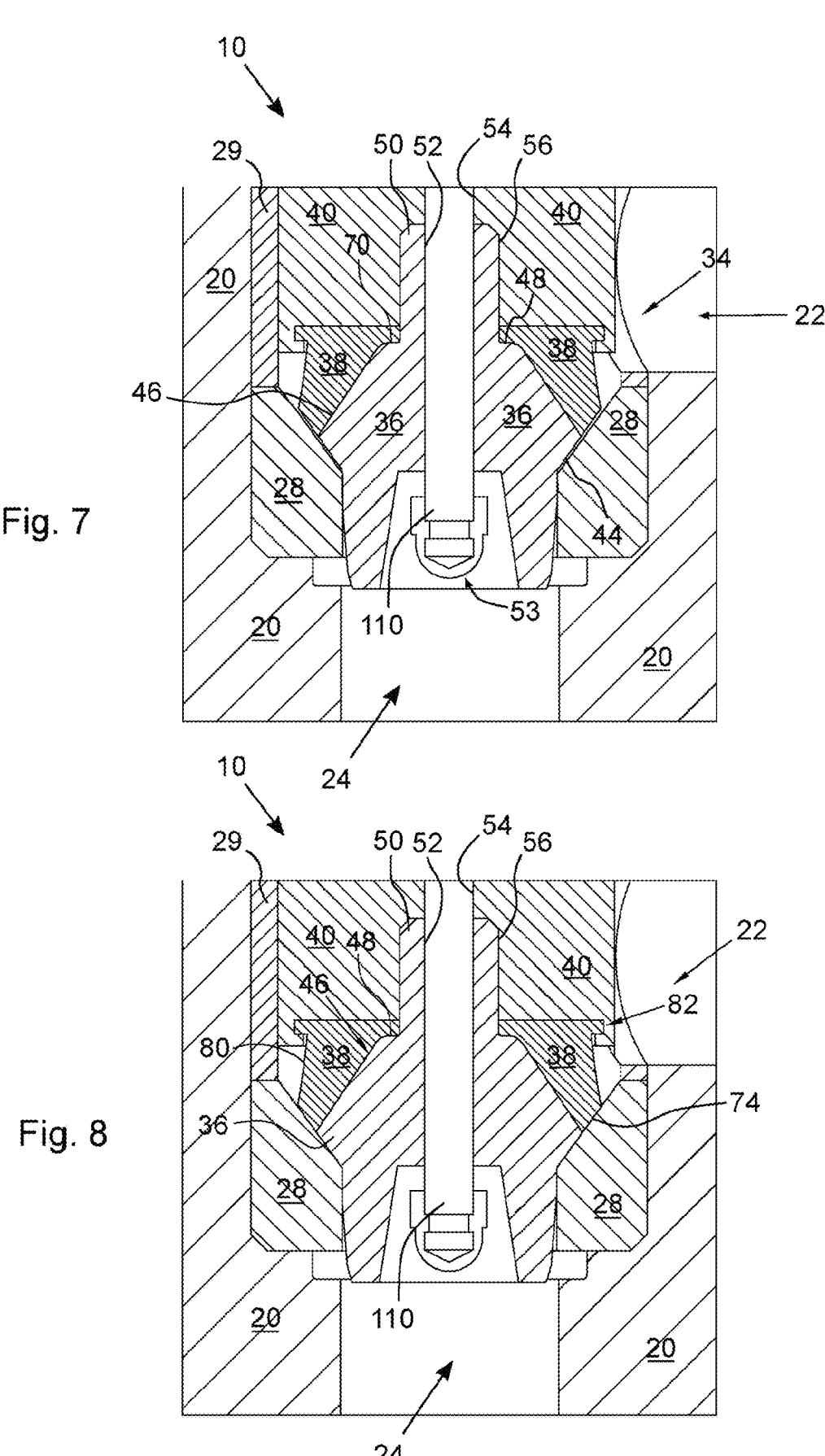

The closure device 32 is moveable along the central bore axis 100 to move the valve body 42 between the fully open position (see FIG. 1) and the fully closed position (see FIG. 8) and is a close fit with the low friction housing sleeve 29. Movement of the closure device 32 is implemented by linear displacement of the threaded rod 110, which is typically connected to a linear hydraulic actuator (not shown), although other displacement mechanisms are possible.

Figure 10:
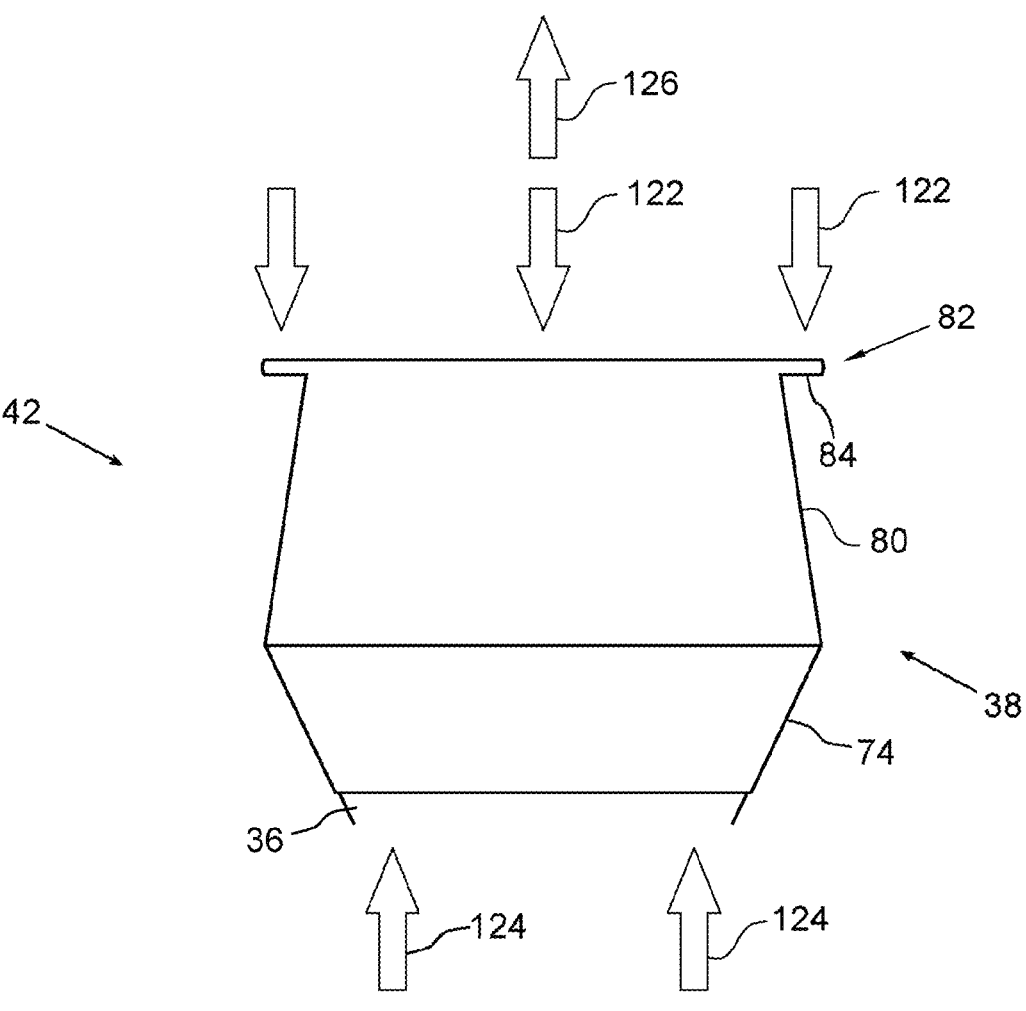
FIG. 10 illustrates diagrammatically a pressure differential across the elastomeric seal when the valve body of the valve is in its closed position.

As can best be seen in FIG. 10 of the drawings, when the valve body 42 is in its closed position, by virtue of the pressure difference across the valve body 42, the closing force indicated by arrows 122, i.e., the pressure applied by the medium (such as slurry) on the valve body 42 is substantially higher than the pressure applied on the other side (i.e. an opening force), generally indicated by reference numerals 124, which is applied to the valve body 42 by medium on a side of the valve body.

To displace the closure device 32 (and therefore the valve body 42 which is a part thereof) from its closed position to its open position, an opening load is applied to the threaded rod 110 by the actuator in the direction of arrow 126. However, because of the pressure differential across the valve body 42, the external frusto-conical contact surface 74 of the elastomeric seal 38 typically remains in contact with the valve seat 28 and the elastomeric seal annular body 60 is extended as the valve body 42 moves to the open position (upwards in this embodiment). Thus, in effect, the elastomeric seal 38 "sticks" to the valve seat 28. In extreme cases, the deformation of the elastomeric seal 38 could lead to damage thereof or to it being dislodged partially or completely from the engagement portion 36.

However, in this embodiment of the present invention, the piston 40 provides support to a part (the cap portion protrusion 84) of the elastomeric seal 38 at the opposing end of the elastomeric seal 38 to the external frusto-conical contact surface 74, to prevent, or at least greatly reduce, sticking of the external frusto-conical contact surface 74 to the valve seat 28. In addition, the circular flange 48 provides further support to another part (the flange engagement surface 76) of the elastomeric seal 38 to further reduce such sticking and the likelihood of the cap portion protrusion 84 from 'popping out' of the recess 99.

This elastomeric support function is provided by the lip 96 that projects radially inwards towards the central bore 54. The lip 96 engages with the protrusion 84 of the cap portion 82 such that an upward (in this embodiment) force in the direction of arrows 126 is applied to an underside of the cap portion 82 (by virtue of the piston 40 being raised) to assist with lifting the entire annular body 60 of the elastomeric seal 38, thereby minimising or preventing sticking. This upward force on the underside of the protrusion 84 resists deformation of the elastomeric seal 38 in the opposite direction.

In addition, the protrusion 84 is sandwiched between the elastomer engagement surface 94 and the lip 96, which serves to hold it in place and allow some radially outward deformation thereof, until it reaches the outer radial edge of the recess 99 (or until it fills the lip expansion cavity 102).

Further, the complementary frusto-conical surfaces 72, 46 on the elastomeric seal 38 and on the engagement portion 36, respectively, further serve to resist displacement of the elastomeric seal 38 in a direction opposite to the direction of arrow 126. It will be appreciated that, by virtue of the complementary internal frusto-conical contact surface 72 of the elastomeric seal 38 and the seal support surface 46 of the engagement portion 36, any displacement of the elastomeric seal 38 relative to the engagement portion 36 in a direction opposite to the direction of arrow 126 will tend to expand the elastomeric seal 38 radially which will urge the lip 96 more firmly into the recess 99 to retain the elastomeric seal 38 in position.

Accordingly, in use, when the valve body 42 is initially displaced away from its closed position, by virtue of the natural resilience of the material of the elastomeric seal 38, the external frusto-conical contact surface 74 of the elastomeric seal 38 will initially remain in contact with the valve seat 28 even after the annular seal surface 44 (of the engagement portion 36) is no longer in contact with the valve seat 28. However, further displacement of the valve body 42 away from its closed position will result in the elastomeric seal 38 being displaced together with the rest of the valve body 42 to its open position with the lip 96 serving to retain the elastomeric seal 38 in position and resist deformation which could lead to damage of the elastomeric seal 38.

The valve 10 described above could be used in any convenient application, for example in a positive displacement pump. The valve 10 may be used as an inlet valve or an outlet valve, in any convenient orientation.

It will be appreciated that a PEC pumping system could be constructed having multiple valves 10. The components of the PEC pumping system could be transported in knocked down or kit form for assembly on site. Alternatively, an existing PEC pumping system could be modified by replacing one or more of the valves with a valve 10 in accordance with an embodiment of the invention.

LIST OF REFERENCE NUMERALS

Valve 10
Housing 20
First fluid port (inlet) 22
Second fluid port (outlet) 24
Flow path 26
Valve seat 28
Housing sleeve 29
Valve seat narrow end 30
Valve seat wider end 32
Closure device 34
Engagement portion 36
Elastomeric seal 38
Piston 40
Valve body 42
Annular seal (or sealing) surface (of engagement portion) 44
Seal support surface (of engagement portion) 46
Circular flange (of engagement portion) 48
Cylindrical sleeve (of engagement portion) 50
Central bore (of engagement portion) 52
Enlarged cavity (of engagement portion) 53
Narrow central bore (of piston) 54
Wider central bore (of piston) 56
Annular body 60
Piston end 62
Valve seat end 64
Profiled central aperture 66
Cylindrical piston portion 68
Expansion spacing 69
Frusto-conical valve seat portion 70
Internal frusto-conical contact surface 72
External frusto-conical contact surface 74
Flange engagement surface 76
Tapered sidewall 80
Cap portion 82
Protrusion 84

Cylindrical body 90
Outer surface 92
Elastomer engagement surface (of piston) 94
Collar 95
Lip 96
Annulus 98
Recess 99
Central bore axis 100
Lip expansion cavity 102
Threaded rod 110
Securing nut 112
Closing force 122
Opening force 124
Opening load 126

The invention claimed is:

1. An actuated valve which includes:
a housing;
an inlet leading into the housing;
an outlet leading from the housing at a position spaced from the inlet;
a flow path connecting the inlet and the outlet in flow communication;
a valve seat positioned in the flow path and comprising a frusto-conical shape;
a valve body which is displaceable between a closed position in which it inhibits the flow of medium through the flow path and an open position in which it permits the flow of medium through the flow path, the valve body including:
an engagement portion having an annular seal surface comprising a frusto-conical shape complementary to and configured to abut sealingly against the valve seat when the valve body is in its closed position and a seal support surface comprising a frusto-conical shape widening as it extends towards the annular seal surface;
an elastomeric seal mounted on the seal support surface and having (i) a contact surface protruding laterally beyond the annular seal surface of the engagement portion and which is complementary to and abuts against the valve seat when the valve body is in its closed position so that the contact surface makes contact with the valve seat before the sealing surface when the valve body is displaced towards its closed position and (ii) a cap portion having a radius and height and forming a protrusion extending radially outwards at an upper portion thereof; and
a retainer comprising an inwardly projecting lip defining a recess having a length and height, where the radius and height of the cap portion are slightly smaller than the length and height of the recess for accommodating the cap portion therein to assist with lifting the elastomeric seal, and to define a lip expansion cavity to allow some radially outward deformation of the cap portion into the recess,
thereby minimising or preventing sticking or deformation of the elastomeric seal when the valve body is displaced away from its closed position towards its open position.

2. The valve as claimed in claim 1, wherein the elastomeric seal includes a tapered sidewall extending from beneath the cap portion to the contact surface, where the tapered sidewall tapers radially inwards from the contact surface to beneath the cap portion.

3. The valve as claimed in claim 2 further comprising a piston coupled to the valve body and defining the retainer.

4. The valve as claimed in claim 3, wherein the piston is coupled to the cap portion.

5. The valve as claimed in claim 3, wherein the lip extends for at least 5% of the distance from an outer surface of the piston towards a centre thereof.

6. The valve as claimed in claim 2, wherein an end of the cap portion protrudes beyond the contact surface of the elastomeric seal.

7. The valve as claimed in claim 1, wherein an internal contact surface of the elastomeric seal is mounted onto the seal support surface.

\* \* \* \* \*